United States Patent [19]

Lopez et al.

[11] 3,916,498

[45] Nov. 4, 1975

[54] PALLET DISASSEMBLING METHOD AND APPARATUS

[75] Inventors: Albert Lopez, Norwalk; James Adams, San Gabriel, both of Calif.

[73] Assignee: Safeway Stores, Incorporated, Oakland, Calif.

[22] Filed: June 17, 1974

[21] Appl. No.: 479,894

[52] U.S. Cl. .................................. 29/200 D; 29/252
[51] Int. Cl.[2] .......................................... B23P 19/00
[58] Field of Search ......... 29/427, 200 D, 244, 252, 29/256, 258, 200 R, 200 B; 100/226, 227

[56] References Cited
UNITED STATES PATENTS

| 2,593,843 | 4/1952 | Cannon............................. 29/200 D |
| 3,512,242 | 5/1970 | Harvis.................................... 29/252 |
| 3,740,815 | 6/1973 | Campbell et al..................... 29/252 |

Primary Examiner—C. W. Lanham
Assistant Examiner—James R. Duzan
Attorney, Agent, or Firm—Flehr, Hohbach, Test, Albritton & Herbert

[57] ABSTRACT

Method and apparatus for disassembling a wooden pallet. A vertically movable carrier is provided with a pair of horizontal tines which are insertable in the openings formed between the slats and ribs of a pallet. A plurality of upper and lower breaker members are mounted above and below the tines so as to register with the portions of the ribs located between adjacent slats. Actuating means is provided to move the tines up and down so that the slats of a pallet carried thereon are moved across the plane of the ends of the breaker members to cause the slats and ribs to be pulled apart and separated for salvage.

6 Claims, 4 Drawing Figures

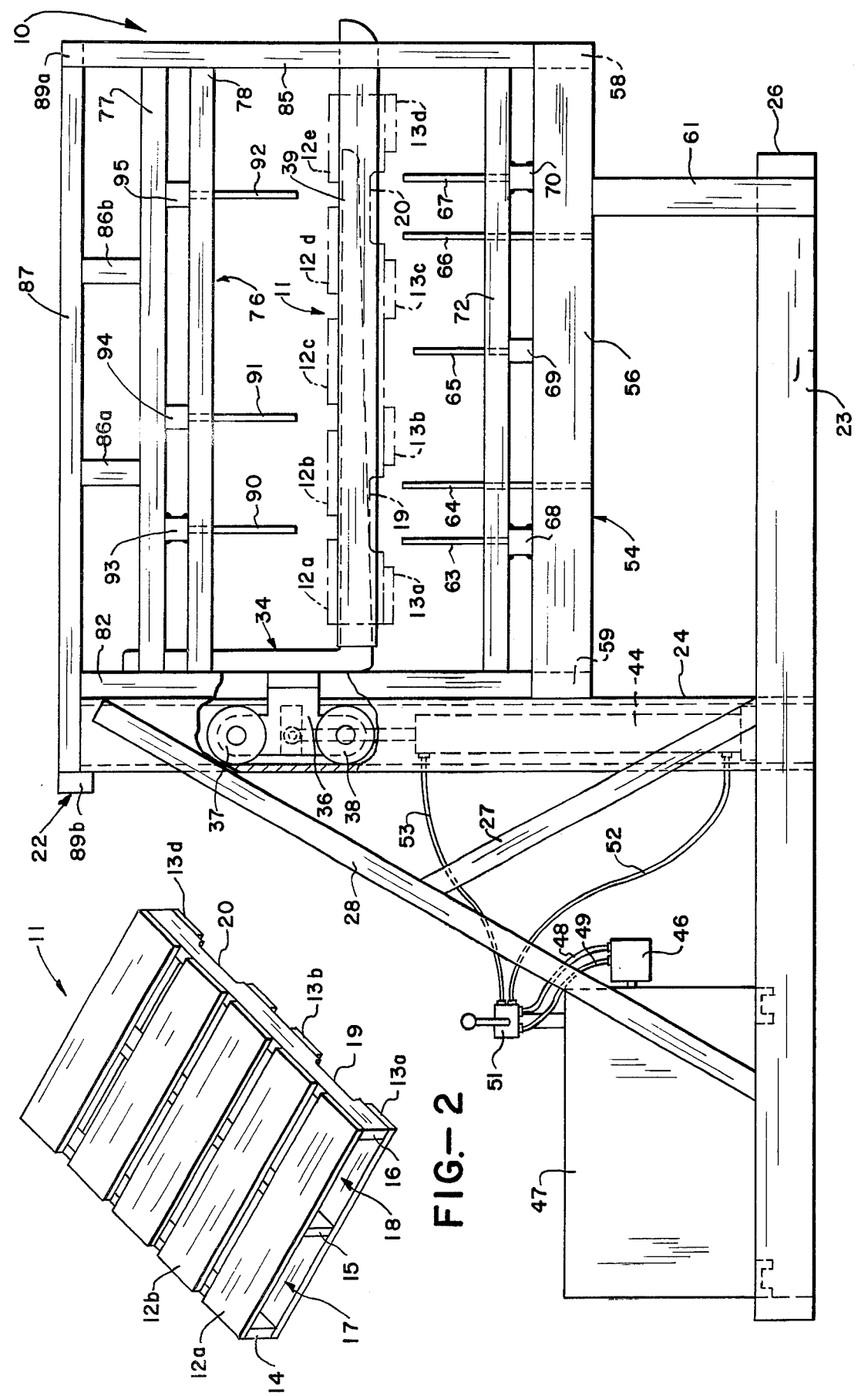

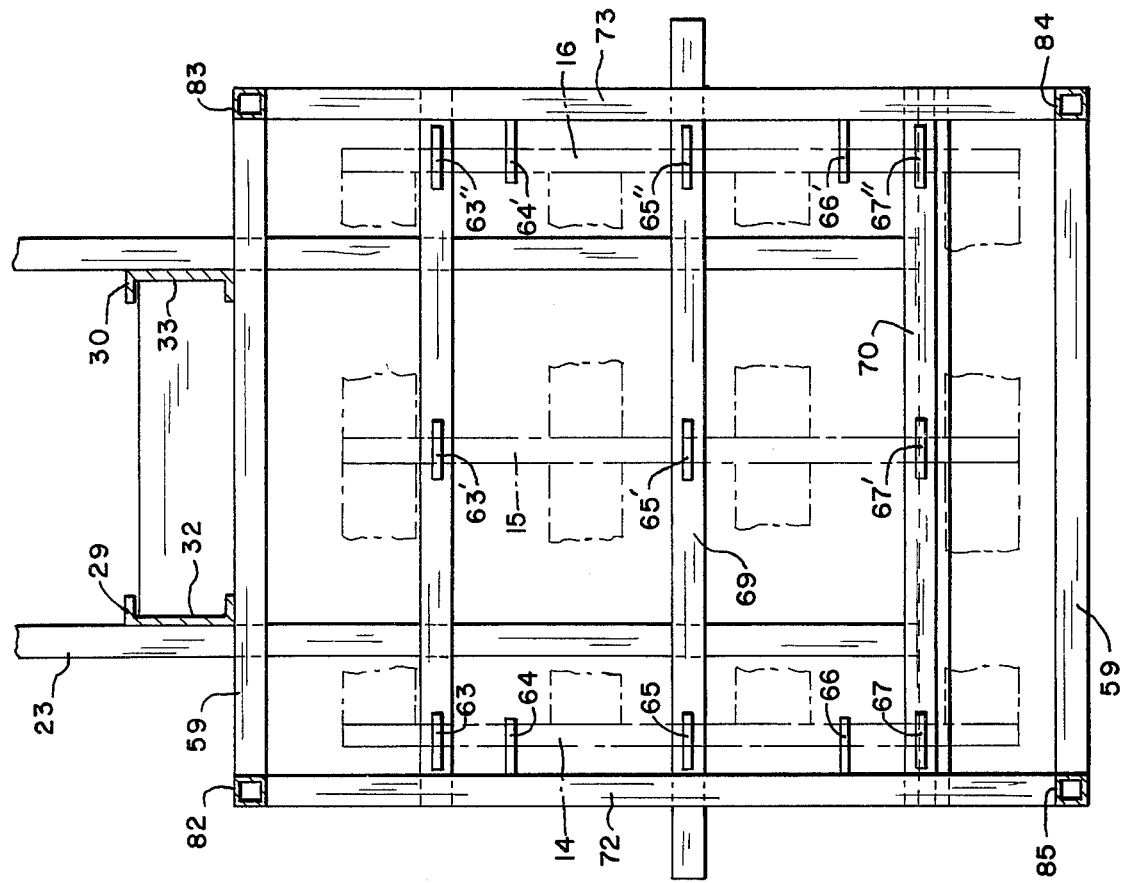
FIG.—4
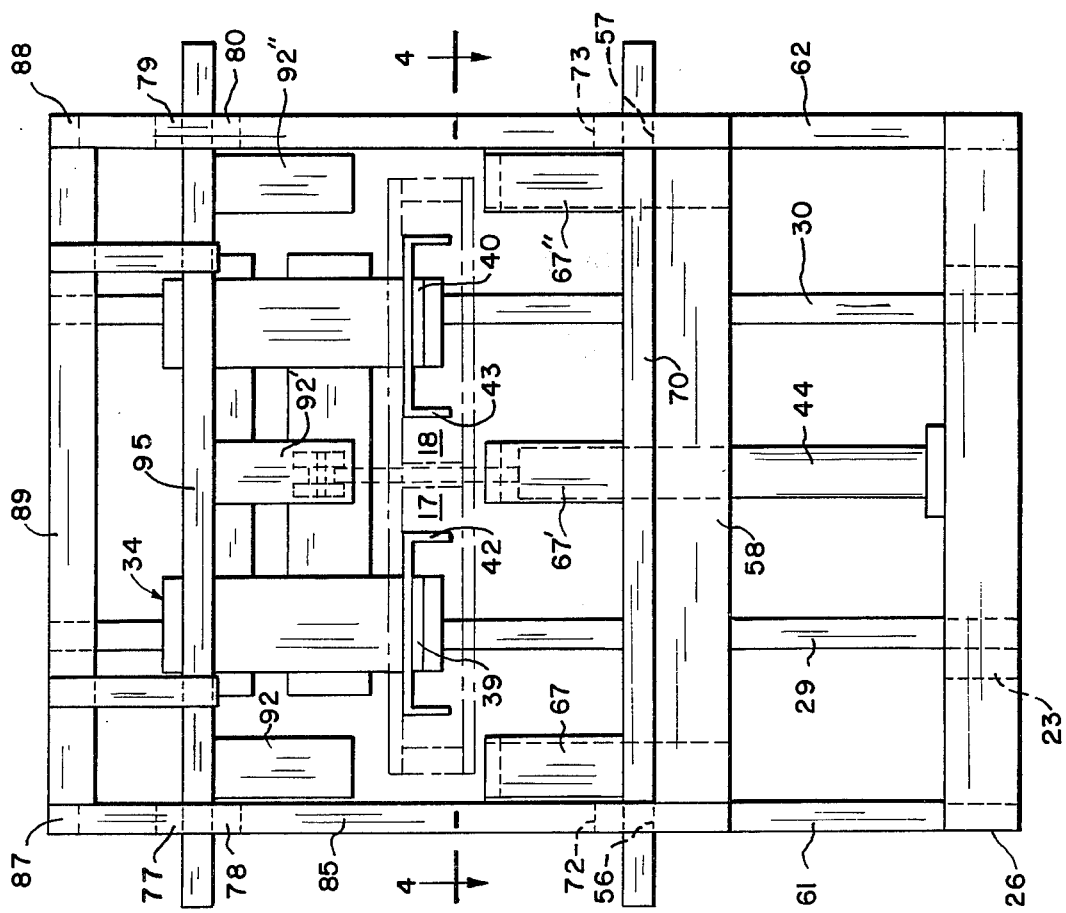
FIG.—3

PALLET DISASSEMBLING METHOD AND APPARATUS

BACKGROUND OF THE INVENTION

This invention relates to cargo carrying wooden pallets, and in particular relates to the disassembly of such pallets for purposes of recovery and reuse of the slats and ribs that used in their construction.

Cargo carrying pallets that are constructed of wooden slats and ribs are commonly used for handling and carrying a wide range of goods annd cargo. Boxes of the cargo typically are loaded on the pallets and a material handling vehicle, such as a forklift truck, is then used to pick up and move the loaded pallet. The forklift trucks are adapted to move the pallets into and from truck trailers and railroad cars, and also to move, stack and position the loaded pallets at loading docks, warehouses and other storage areas.

Pallets of the foregoing character oftentimes are damaged and rendered unsafe or usuable when the slats and ribs are broken or cracked during use. It is then necessary to replace the pallets. However, because of the relatively high cost of lumber, eg., the wooden ribs and slats can cost as much as fifty cents each, it is desirable to break apart or disassemble the pallets so that the unbroken slats and ribs can be salvaged for rebuilding into additional pallets. Heretofore, it has been exceedingly difficult to break such pallets apart, especially where they are assembled by the use of helical or twisted nails. In the past workers have used crowbars or other similar tools to manually break the pallets apart, but this is slow and expensive in view of the high cost of labor. In many cases broken or damaged pallets have merely been discarded without attempting to salvage the usuable slats and ribs. Accordingly, the need has been recognized for a means which will make it feasible to salvage the usuable lumber from broken or damaged pallets.

OBJECTS AND SUMMARY OF THE INVENTION

It is a general object of the invention to provide method and apparatus which will rapidly and easily disassemble cargo carrying pallets for salvaging the lumber therefrom.

Another object is to provide method and apparatus of the character described by which a single operator can load a pallet, manipulate the controls for actuation to separate the slats from the ribs of the pallet, and remove the separated parts in a relatively short cycle time.

Another object is to provide method and apparatus of the character described which is capable of disassembling pallets with a wide range of overall size and of varying board sizes and spacing, and further which is capable of disassembling pallets of either two-way entry design.

Another object is to provide method and apparatus of the character described in which pallets are loaded onto a pair of tines that are adapted to be elevated and lowered with respect to upper and lower breaker bars mounted on a frame, and in which certain of the breaker bars are adapted to be adjustably positioned so as to register with the pallet ribs at variable spacing between the slats.

The invention is characterized in providing a pallet carrier mounted for movement on a frame. The carrier includes a pair of elongate tines which are adapted to be positioned within the spacing or openings formed between the ribs and slats of each pallet. Breaker members are mounted on the frame on opposite sides of the tines in register with the ribs of a pallet which is mounted on the carrier. Certain of the breaker members are adapted to be adjustably positioned along the ribs so as to register with a variable spacing between the slats which are fastened to the ribs. Actuating means is provided for moving the carrier relative to the breaker members whereby the slats are pulled and separated from the ribs as the tines are moved across the plane of the edges of the breaker members. The separated slats and ribs are then removed and another pallet is mounted on the tines for disassembly in the manner described.

Additional objects and features of the invention will appear from the following description in which the preferred embodiment has been set forth in detail in conjunction with the accompanying drawing.

BRIEF DESCRIPTION OF THE DRAWING

FIG. 1 is a side elevational view of apparatus of the invention;

FIG. 2 is a perspective view of a pallet of the type that is disassembly by the apparatus of FIG. 1;

FIG. 3 is an end elevational view of the apparatus of FIG. 1; and

FIG. 4 is a sectional view taken along the line 4—4 of FIG. 3.

DESCRIPTION OF THE PREFERRED EMBODIMENT

In the drawing FIG. 1 illustrates generally at 10 apparatus constructed in accordance with the invention which is used for disassembling or dismantling cargo carrying wooden pallets, of which a typical pallet 11 is illustrated in FIG. 2. The exemplary pallet 11 is characterized in having a plurality of flat, spaced-apart parallel wooden slats 12, 13 which are fastened to and extend laterally across three upright, spaced-apart parallel wooden ribs 14–16. The slats and ribs define a pair of openings 17, 18 into which the two blades of a forklift truck, not shown, can be inserted and removed from either end of the pellet. The pallet 11 is of four-way, design, i.e. the lower edges of the three ribs are formed with cut-outs 19, 20 of a width slightly greater than the width of the forklift blades so that such blades can be inserted into these openings from either side of the pallet. Thus, a forklift truck can pick up the four-way pallet 11 from any one of its sides or ends. The invention also can be used in disassembling pallets of two-way design without the cut-outs where entry of the forklift blades is made only from the two ends of the pallet. The invention furthermore can be used for disassembling pallets of different board sizes and spacing, and for disassembling pallets of a range of overall size.

Apparatus 10 includes a frame 22 which comprises a base 23 upon which an upstanding mast 24 is mounted. The base is formed of box-section tubular members 26 which are welded together in a generally rectangular configuration. The mast is welded to these tubular members and is reinforced by means of pairs of cross braces 27, 28. The base can be anchored to a suitable foundation or floor, or alternatively can be unanchored to permit it to be easily transported between work locations.

The mast 24 comprises a pair of upstanding channels 29, 30 secured at their lower ends to the tubular members of base 23. The inwardly facing sides of the channels are formed with vertically extending recessed guide tracks 32, 33.

A pallet carrier 34 is mounted for vertical movement with the tracks 32, 33. The pallet carrier includes a truck 36 which extends between the two channels and which carries at each of its opposite sides a vertically spaced pair of wheels 37, 38. The wheels are adapted to roll within the guide tracks as the carrier is moved up and down. The carrier 34 further includes pairs of horizontally extending, laterally spaced-apart elongate tines 39, 40 which are mounted at their inner ends to the truck. The tines are spaced apart a sufficient dimension which permits the pallet 11 of FIG. 2 to be placed on the carrier structure with the tines inserted in the two openings 17, 18 formed between the ribs and slats. A pair of downwardly-facing elongate spacer channels 42, 43 are secured by suitable means such as welding to the upper surfaces of respective tines 39, 40. The lateral width of each spacer channel is commensurate generally with the inner width of each pallet opening so as to properly center the pallet on the tines.

Actuating means is provided to move the pallet carrier, and this actuating means includes an extensible hydraulic cylinder 44 having its lower, head end secured to base 23 and with its rod end secured to the upper end of truck 36. The cylinder is extended and retracted to raise and lower the carrier by means of pressurized hydraulic fluid. A source of pressurized fluid is supplied from hydraulic pump 46 which is driven from a suitable motor 47, such as an AC electric motor. Supply and return fluid conduits 48, 49 extend from the pump to a suitable manually operated two-way flow control valve 51 which is adapted to direct pressurized fluid into either of the conduits 52, 53 to the head or rod ends of actuator 44, and to direct return fluid from the actuator back to pump 46. While the control valve 51 is shown as being positioned adjacent the motor and pump, this valve could also be located at the opposite end of the frame adjacent the loading end of the tines to afford convenient access for the operator to manipulate the control valve without having to shift his postion for loading pallets onto the tines.

A lower sub-frame assembly 54 extends forwardly from the mast at a location below the pair of tines 39, 40. This sub-frame assembly includes a pair of spaced-apart side rails 56, 57 which are secured at opposite ends to a pair of front and rear rails 58, 59. Preferably these rails are comprised of box section tubing. The rear rail 59 is attached to the forward face of mast 24, and the two side rails are supported above the frame by means of a pair of support columns 61, 62.

A plurality of lower breaker members 63–67 are mounted on sub-frame assembly 54. These breaker members comprise elongate flat bars which extend upwardly in a direction along opposite sides of the tines in register with the bottom edges of the ribs of a pallet which is positioned on the tines, as shown in FIG. 4. The breaker members 63, 65 and 67 are carried by means of three cross-beams 68, 69 and 70. The cross beams are positioned along the upper edges of the two side rails 56, 57, and a pair of smaller box section tubular rails 72, 73 extend across the outboard ends of the cross beams in vertical register with the side rails.

The inner group of three laterally spaced breaker members 63 are secured at their lower ends to the cross beam 68 which is affixed at its outboard ends to the side rails by suitable means such as welding. The second group of three laterally spaced breaker members 65 are secured at their lower ends to the center cross beam 69 which is free to slide along the spacing between the pairs of rails. The outboard ends of center cross beam 69 project outwardly from the side rails to form handles which permit the operator to adjust the lengthwise postion of this cross beam so that the breaker members which it carrys can be spot positioned to register with any variation in the spacing between the slats of an overlying pallet. The third group of breaker members 67 is mounted to the cross beam 70 which is secured at its outboard ends to the side rails by suitable means such as welding. Additionally, the two pairs of breaker members 64 and 66 are fixedly secured to respective inboard sides of the side rails, and the upper edges of these latter breaker members terminate in a plane common with the terminal ends of the breaker members 63 and 67 carried by the fixed cross beams. As best shown in the side view of FIG. 1 the stationary breaker members extend upwardly a greater distance than the breaker members 65 carried by adjustable cross beam 69. This permits the ends of the stationary members to contact the recesses 19, 20 in the ribs of pallet 11 at the same time that the ends of adjustable members 65 contact the bottom edges of these ribs. As shown in FIG. 4 the breaker members are spaced-apart so as to register with the three ribs 14–16 and the width of each breaker member is sufficiently long so as to accommodate pallets with a range of rib spacing and size.

An upper sub-frame assembly 76 is positioned above the pair of tines 39, 40. This sub-frame assembly includes pairs of vertically spaced apart upper and lower box section tubular rails 77, 78 and 79, 80 which are secured to and extend between four upright corner posts 82—85. Assembly 76 is braced by means of box section tubular rails 87, 88 which are secured between the upper ends of the corner posts, by a front rail 89a which extends across the ends of the two front corner posts, and by a rail 89b which extends across the upper ends of the channels 29, 30. Two pairs of vertical supports posts 86a, 86b are mounted on opposite sides between the rails 77, 87, 79, 88.

A plurality of upper breaker members 90, 91 and 92 are mounted on respective cross beams 93, 94 and 95. These members extend downwardly in a direction along opposite sides of the tines in register with the upper side edges of the three pallet ribs. The first group of three laterally spaced breaker members 90 is mounted to the cross beam 93 which is secured at its outboard ends to the opposite pairs of rails by means such as welding. A second group of three laterally spaced breaker members 91 is mounted on the central cross beam 91 which is slidably mounted between the opposite pairs of rails 77–80. The outboard ends of cross beam 91 project outwardly from the sides of the rails to provide handles for an operator to manually adjust the position of the cross beam so that its breaker members register with variable spacing between the pallet slats. The third group of three laterally spaced breaker members 92 is mounted on cross beam 95 which is also slidably mounted at its outboard ends between the same rail pairs. The projecting outboard ends of beam 92 serve as handles for manually adjusting its position. The lower ends of the breaker members carried by the three upper cross beams lie in a common plane so as to jointly contact the upper edges of the three ribs for separation of the upper slats.

Apparatus 10 of the invention can also be adapted for the disassembly of pallets that are of two-way entry design, i.e. pallets in which the cut-outs 19, 20 as shown in FIG. 2 are not formed in the ribs. For such an adaptation all lower breaker members 63–67 are formed with their distal ends lying in a common plane so that, as the tines and pallet move downwardly, the ends of these breaker members jointly contact the lower edges of the pallet ribs for removal of the lower slats.

The use and operation of apparatus 10 will be described in connection with the disassembly of wooden pallets in which certain of the slats or ribs are broken or cracked or are otherwise damaged. For conditioning the pallets prior to disassembly, stacks of the pallets are sprinkled with water and permitted to soak for a number of hours, such as over-night. This soaking causes the slats and ribs to become more flexible so that disassembly is facilitated.

With the tines of the apparatus positioned midway between the upper and lower breaker members, as illustrated in FIGS. 1 and 2, the operator loads a pallet by pushing it onto the tines and channels 42, 43 which are inserted through the pallet openings 17, 18 as shown in FIG 3. The position of the pallet is manually adjusted both lengthwise and laterally of the tines so that the first group of breaker members 90 carried on stationary beam 93 are in register with the upper edges of the ribs at the spacing between the first and second slats 12a and 12b. The operator then moves to either side of the apparatus and grasps the outer end projections of central beam 94 and moves it until its breaker members 91 register with the ribs at the spacing between the slats 12b and 12c. Similarly the front beam 95 is adjusted until its breaker members 92 register with the ribs at the spacing between the pair of slats 12d and 12e.

With motor 47 energized and driving pump 46 to supply a source of pressurized hydraulic fluid, the operator manipulates valve 51 to direct the fluid through conduit 52 to the head end of cylinder 44. The cylinder is thereby cause to extend and move truck caused upwardly along the mast. The truck in turn carries the tines and pallet upwardly until the distal ends of the upper breaker members contact the upper edges of the three ribs, which are thereby blocked in their upward travel. Continued movement of the tines past the plane of the distal ends of the breaker members carries the slats upwardly so that they are pulled or otherwise disassembled from the ribs, and this is normally accompanied by the fastening nails being pulled from the ribs at the same time.

To disassemble the lower slats, the operator adjustably positions, as required, the pallet lengthwise of the tines so that the fixed breaker members 63, 64 and 66, 67 are in register with the bottom edges of the ribs in the regions of the cut-out portions 19, 20. As required, the operator adjustably positions the central cross beam 69 so that the breaker members 65 which it carries are in register with the ribs at the spacing between the slats 13b and 13c.

The operator then reversely manipulates valve 51 to direct pressurized fluid through conduit 53 into the rod end of the actuator, which thereby retracts and moves truck 36 downwardly along the mast. This causes the tines and pallet to move downwardly until the distal ends of the lower breaker members contact the lower edges of the ribs, which are blocked in their downward movement. Continued movement of the tines carries the slats below the plane of the distal ends of the lower breaker members and this causes the lower slats to be pulled or otherwise disassembled from the ribs. The operator then manually removes the separated slats and ribs by reaching through the end sides of the apparatus. The usable lumber is then stacked for salvage and subsequent assembly into additional pallets, and the broken or cracked lumber is segregated and discarded. The control valve 51 is then manipulated to return the tines to their midposition between the breaker members. Additional pallets are then loaded onto the tines and disassembled by repeating the foregoing procedures.

While the foregoing embodiments are at present considered to be preferred it is understood that numerous variations and modifications may be made therein by those skilled in the art and it is intended to cover in the appended claims all such variations and modifications as fall within the true spirit and scope of the invention.

We claim:

1. Apparatus for disassembling cargo carrying pallets which are constructed of a plurality of generally parallel, spaced-apart slats that are fastened to and extend laterally across, the top and bottom edges of a plurality of generally parallel, spaced-apart ribs, comprising a combination of a frame, a pallet carrier mounted on the frame for engaging the ribs, the pallet carrier including a plurality of elongate horizontally extending tines adapted to be positioned within the spacing formed between an adjacent pair of ribs and the slats which overlie such ribs, first and second breaker members mounted on the frame for engaging the ribs or the pallet, said first breaker members being mounted at a fixed elevation on the frame above the pallet carrier and in register with the top side edges of the pallet ribs at positions thereof which are between adjacent pairs of the slats, the second breaker members being mounted at another fixed elevation on the frame below the pallet carrier and in register with the bottom side edges of the carrier ribs at portions thereof which are between adjacent pairs of the slats, and actuating means operable in one mode for moving the pallet carrier and tines toward the first breaker members whereby the slats on the top edges of the ribs of a pallet mounted on the tines are separated from the ribs, said actuator means further being operable in another mode for moving the carrier and tines toward the second breaker members whereby the slats on the bottom edges of the ribs are separated therefrom.

2. Apparatus as in claim 1 which includes means for selectively moving at least certain of the breaker members in a direction along the length of the pallet ribs to register with a variable location of the rib portions which are between adjacent slats.

3. Apparatus as in claim 1 which includes an upright mast mounted on the frame, and means mounting the carrier for vertical movement along the mast with the distal ends of the tine means projecting horizontally outwardly therefrom for receiving the pallets.

4. Apparatus as in claim 3 in which the first breaker members comprise elongate bars mounted on an upper portion of the frame and which project in a direction downwardly along opposite sides of the tine means, and the second breaker members comprise elongate bars mounted on a lower portion of the frame and which project in a direction upwardly along opposite sides of the tine means.

5. Apparatus as in claim 4 in which certain of the elongate bars are mounted on one or more horizontal cross beams which extend in a direction laterally of the tines, and including means for mounting the cross beams for selective movement in a direction along the length of the ribs of a pallet which is carried by the tines.

6. Apparatus for disassembling cargo carrying pallets which are constructed of a plurality of generally parallel, spaced-apart slats that are fastened to and extend laterally across the top and bottom edges of a plurality of generally parallel, spaced-apart ribs, comprising the combination of a frame having an upright mast, a carrier mounted for substantially vertical movement on the mast, a pair of horizontally spaced-apart elongate tines mounted on the carrier for insertion into the spacing formed between the ribs and slats of the pallet, a plurality of upper elongate bars mounted on the frame above the tines and which extend in a direction downwardly in register with the top edges of the ribs of a pallet which is positioned on the tines, means for mounting at least an opposed pair of said bars for movement in a direction along the length of said ribs for selective positioning between an adjacent pair of the slats which overlie such ribs, a plurality of lower elongate bars mounted on the frame below the tines and which extend in a direction upwardly in register with the bottom edges of the ribs of the pallet which is positioned on the tines, means for mounting at least an opposed pair of said additional bars for movement in a direction along the length of said ribs for selective positioning between an adjacent pair of the slats which underlie such ribs, hydraulic actuator means mounted on the frame for the moving the carrier along the mast, a source of hydraulic fluid under pressure, and valve means for directing fluid from said source to said actuator for selectively moving the carrier toward either of said upper and lower bars whereby the slats of a pallet are carried by the tines across the plane of the ends of the elongate bars for causing separation of the slats from the ribs.

* * * * *